(12) United States Patent
Detrano

(10) Patent No.: US 6,191,206 B1
(45) Date of Patent: *Feb. 20, 2001

(54) SILICA CONTAINING TIRE COMPOSITIONS FOR SUPPRESSION OF STATIC CHARGE ACCUMULATION

(75) Inventor: Mario N. Detrano, Massillon, OH (US)

(73) Assignee: Bridgestone/Firestone, Inc., Akron, OH (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 09/134,837

(22) Filed: Aug. 17, 1998

Related U.S. Application Data

(63) Continuation of application No. 08/826,855, filed on Apr. 10, 1997.

(51) Int. Cl.$^7$ ........................................... G08K 3/01
(52) U.S. Cl. .................... 524/492; 524/493; 524/495; 524/496
(58) Field of Search .................. 524/495, 496, 524/492, 43

(56) References Cited

U.S. PATENT DOCUMENTS

| | | |
|---|---|---|
| 4,153,589 | 5/1979 | Triolo . |
| 4,510,078 | 4/1985 | Mehta . |
| 5,082,596 | 1/1992 | Fukuda et al. . |
| 5,143,967 | 9/1992 | Krishnan et al. . |
| 5,159,009 | 10/1992 | Wolff et al. . |
| 5,336,730 | 8/1994 | Sandstom et al. . |
| 5,480,626 | 1/1996 | Klasen et al. . |
| 5,518,055 | 5/1996 | Teeple et al. . |
| 5,872,171 | * 2/1999 | Detrano ............................... 524/495 |

FOREIGN PATENT DOCUMENTS

| | | |
|---|---|---|
| 0 663 421 A1 | 7/1995 | (EP) . |
| 0 705 722 A1 | 4/1996 | (EP) . |

OTHER PUBLICATIONS

An article entitled "Conducting Rubber Compounds: Use of Superconducting Carbon Black", by Nicholas Probst, Degussa SA; Phillips Petroleum Co., Ind. d. Gomma, 30, No. Oct. 10, 1996, pp. 41/90.

An artlce entitled "Conductive Rubber Compounds –Compounding with Extra Conductive Carbon Black", by Nicholas Probst, Phillips Petroleum Chemicals SA, Conference Proceedings; SRC 85 New Technology for Improved Design with Rubber; Proceedings of the 8$^{th}$ Scandinavian Rubber Conference, Jun. 10–12, 1985, pp. 435–471.

* cited by examiner

*Primary Examiner*—Edward J. Cain
(74) *Attorney, Agent, or Firm*—John H. Hornickel, Esq.; Daniel J. Hudak, Esq.

(57) ABSTRACT

Rubber tire component compositions containing silica have effective amounts of extra conductive carbon black to dissipate static electricity. The volume resistivity in Ohm-centimeters of the component such as a tread is generally $10^8$ or less. The extra conductive carbon black generally has a BET surface area of at least 500 square meters per gram and the silica is generally utilized in amounts of at least 20 parts by weight per 100 parts by weight of the rubber.

16 Claims, No Drawings

SILICA CONTAINING TIRE COMPOSITIONS FOR SUPPRESSION OF STATIC CHARGE ACCUMULATION

CROSS REFERENCE

This is a continuation of U.S. application Ser. No. 08/826,855, filed on Apr. 10, 1997, of Mario N. DeTrano., for SILICA CONTAINING TIRE COMPOSTIONS FOR SUPPRESSION OF STATIC CHARGE ACCUMULATION.

FIELD OF THE INVENTION

The present invention relates to tire compositions which contain silica and static-electricity dissipative carbon black. More specifically, the present invention relates to silica containing tire treads having an effective amount of extra conductive carbon black to suppress electrical charge accumulation on the tire and the vehicle.

BACKGROUND OF THE INVENTION

Heretofore, carbon black has been utilized in various parts of a tire including the tread to reinforce the same. More recently, silica has been utilized in tire treads to reduce the rolling resistance thereof. In order to abate electrical charge build up, a thin over coat of an electrical conductive carbon black has been applied over the treads as well as the lugs and grooves thereof. Alternatively, an electrostatic discharge ring has been located on at least one shoulder portion of the tire. Extra conductive carbon black has also been utilized in rubber conveyor belts and rubber printing rollers to suppress the build up of static electricity therein.

SUMMARY OF THE INVENTION

Pneumatic tires having silica reinforced components such as treads contain effective amounts of extra conductive carbon black to suppress static charge accumulation. Effective amounts of such carbon blacks when no conventional carbon black is utilized are generally from about 8 to about 50 parts by weight per 100 parts by weight of rubber (PHR). Conventional silica coupling agents are generally also utilized to chemical bond the silica to the rubber.

DETAILED DESCRIPTION

The dissipative electrostatic composition of the present invention can generally relate to any tire component such as the casing, the carcass plies, the sidewall, and preferably the tread. The tire component rubber and especially the pneumatic tire tread compositions of the present invention are made from at least one conjugated diene monomer, or from a conjugated diene and one or more vinyl-substituted aromatic monomers, and optionally from ethylene and propylene monomers, or ethylene-propylene and a non-conjugated diene (i.e, the formation of EPDM rubber). The diene monomers have a total of from 4 to 10 carbon atoms such as 1,3-butadiene, isoprene, 1,3-pentadiene, 2,3-dimethyl-1-3-butadiene, 2-methyl-1,3-pentadiene, 2,3-dimethyl-1,3-pentadiene, 2-phenyl-1,3-butadiene, and 4,5-diethyl-1,3-octadiene. The one or more vinyl-substituted aromatic monomers have a total of from 8 to 12 carbon atoms such as styrene, 1-vinylnaphthalene, 3-methylstyrene (p-methylstyrene), 3,5-diethylstyrene, and the like. Preferred tread rubber compositions generally include natural rubber (cis-1,4-polyisoprene), synthetic polyisoprene, styrene-butadiene rubber, butadiene rubber, and the like.

The tire component composition such as the tread is free of various silicone rubbers such as various organopolysiloxanes, and the like. That is, the tire component composition such as a tread generally contains less than 5 percent and desirably less than 2 percent by weight of organopolysiloxane rubber, e.g., based on the total weight of the tire component rubber and preferably is completely free of such silicone rubbers, and the like.

The silica of the tire component composition generally can contain any type of silica such as fumed, hydrated, and preferably precipitated. Advantages of using silica include reduced rolling resistance and hence improve gasoline mileage of the vehicle. Suitable silicas generally have a BET surface area, as measured utilizing nitrogen gas, of from about 40 to about 600 and preferably from about 50 to about 300 square meters per gram. The actual BET method of measuring the surface area is described in the Journal of The American Chemical Society, Volume 60, page 304 (1930). DBP (dibutylphthalate) absorption values range from about 100 to about 400 and desirably from about 150 to about 300 ml/100 g. The ultimate particle size of the silica is generally from about 0.01 to about 0.05 microns as measured by an electron microscope although smaller or larger particles can exist. The amount of the silica generally ranges from about 20 or 22 to about 90, desirably from about 25 to about 65, and preferably from about 27 or 30 to about 45 parts by weight per 100 parts by weight of the tire component rubber. Commercially available silicas which can be utilized in the present invention include silicas commercially available from PPG Industries under the Hi-Sil trademark such as designations 190, 210, 233, 243, etc.; silicas from Rhone-Poulenc such as Z1165MP and Z165GR; silicas available from Degussa AG such as VN2 and VN3; and silicas from Akzo chemical. The PPG Hi-Sil silicas such as 190 are preferred.

Silica coupling agents are generally utilized to couple, that is to chemically bind the silica to the rubber. Generally any conventional type of silica coupling agent can be utilized such as those having a silane and a constituent component or moiety which can react with the rubber, particularly a sulfur vulcanizable rubber. The coupling agent thus acts as a connecting bridge between the silica and the rubber. The rubber reactive group of a silane coupling agent includes mercapto, polysulfide, amino, vinyl, and epoxy groups with mercapto and polysulfide groups being preferred. Examples of suitable silica coupling agents include N-β-(aminoethyl)-γ-aminopropyltrimethoxysilane, γ-aminopropyltriethoxy silane, bis (β-hydroxyethyl) -γ-aminopropyltriethoxy silane, β-(3,4-epoxycyclohexyl) ethyltrimethoxy silane, γ-glycidoxypropyltrimethoxy silane, γ-methacryloxypropyltrimethoxysilane, vinyl trichlorosilane, vinyl triethoxysilane, and vinyl tris (β-methoxyethyl) silane. A preferred silane coupling agent is bis(3-triethoxysilylpropyl)-tetrasulfide, also known as Si69® manufactured by DeGussa AG. The amount of the silica coupling agent can vary but generally is from about 2% to about 20%, and desirably from about 7% to about 16% by weight based upon the total weight of the silica.

An important aspect of the present invention is the utilization of one or more extra conductive carbon blacks such as extra conductive carbon black to impart conductivity to the tire component composition and especially the tire tread composition which is further described herein below and can include conventional carbon black. An amount of extra conductive carbon black is utilized so as to dissipate or prevent static electricity build up. In other words, the volume resistivity of the tire component composition is generally $10^8$ or less, desirably $10^6$ or less, and preferably $10^4$ or $10^2$ or less Ohm-cm. A high conductive carbon black such as extra conductive carbon black can be defined as carbon black having BET-surface area of at least 500, generally at least 600, desirably at least 750 or 900, and preferably at least 1,000 and even 1,200 square meters per gram. It is noted that extra conductive carbon black generally exists as porous or hollow particles. Moreover, the DBP absorption value is at least 250, and desirably at least 300, and preferably at least 350 ml/100 g. Suitable extra conductive carbon blacks include Printex XE2 manufactured by Degussa, Ketjenblack EC600 manufactured by AKZO, Ensaco 23MM distributed by Vanderbilt, and the like. Although Vulcan XC72 manufactured by Cabot is sometimes referred to as an extra conductive carbon black, it generally is not suitable in the present invention as such since it only has a BET surface area of 254 and a DBP absorption value of 178.

The amount of extra conductive carbon black utilized when nil or small amounts (e.g., less than 15 parts by weight per 100 parts by weight of all rubber compounds) of regular carbon black are utilized in the tire component composition is from about 8 to about 50, desirably from about 9 to about 35, and preferably from about 10 to about 20 parts by weight for every 100 parts by weight of all rubber compounds. Should, however, conventional amounts, for example, at least 15 parts by weight per 100 parts by weight of all rubber compounds of a conventional carbon black be utilized, the amount of the extra conductive carbon black is generally from about 3 parts to about 40 parts by weight, desirably from about 4 to about 25 parts by weight, and preferably from about 5 parts to about 15 parts by weight for every 100 parts by weight of all rubber utilized within the tire component composition.

Although extra conductive carbon black is preferred, optionally, and often desirably conventional carbon black such as furnace black is utilized inasmuch as the same reduces the cost of the rubber composition. Conventional carbon black typically has a BET surface area of less than about 490, or typically about 200 or less square meters per gram, a DBP absorption value of generally about 240 or less, and typically 200 or less. The iodine number of conventional carbon black is typically about 200 or less. Inasmuch as the utilization of conventional carbon black is optional, the amount thereof can be zero, i.e., none, or from about 1 or 2 to about 50 or 80 parts by weight, desirably from about 5, 10 or 15 to about 40 parts by weight, and preferably from about 20 to about 35 parts by weight per 100 parts by weight of the tire component rubber.

The tire component compositions of the present invention such as the tread can be compounded by methods and procedures well known to the rubber compounding art and contain various conventional additives in suitable amounts. For example, curing aids such as sulfur, sulfur containing compounds and the like can be utilized. Vulcanizing accelerators include amines, disulfides, guanidines, thioureas, thiazoles, thiurams, sulfenamides, dithiocarbamates, and the like. Other additives include various oils such as aromatic, napthenic, or paraffinic; various antioxidants such as various phenylenediamines; various antiozonants; various aliphatic acids such as stearic acid; zinc oxide; various waxes such as micro crystalline waxes; various peptizers, and the like.

The conductive silica containing tire compositions of the present invention can be utilized for any tire application wherein it is desirable to suppress static electricity charge or accumulation, both with regard to the tire and to the vehicle. Suitable tire applications include passenger vehicles, off-the-road vehicles, agricultural vehicles, light trucks, trucks and buses, and high performance vehicles. An advantage of the present invention is that the entire tire tread or component is rendered electrically conductive. This assures static charge suppression over the life of the tire. Another advantage is that conventional rubber processing and tire building procedures can be utilized. Moreover, higher amounts of silica can also be used with extra conductive carbon black.

The invention will be better understood by reference of the following examples which serve to illustrate, but not to limit the present invention.

EXAMPLES

A series of tread compositions containing progressively higher amounts of extra conductive carbon black, i.e., Printex XE2, were prepared and evaluated for volume resistivity. The various components of Table 1 were blended and cured in a conventional manner well known to the art and to the literature. For example, the various components can be added at different stages. Typically, the rubbers, such as a styrene-butadiene rubber and polybutadiene are mixed in a first stage with various fillers such as the extra conductive carbon black, the silica and the various processing aids and antioxidants for about 6 minutes or until a Banbury thermocouple reaches about 320° F., whichever occurs first. The various remaining fillers and coupling agents are then added and mixed for a maximum of 5 minutes or until a Banbury thermocouple reaches 260° F., whichever occurs first. After the second stage mixing, a final or third stage mixing is generally utilized wherein all curatives and remaining compounds are added and mixed at a low temperature for 2 minutes, or up until a Banbury thermocouple reaches the temperature of 180° F., whichever occurs first. The compounded rubber can then be shaped in any desirable form and subsequently cured.

Tire tread compositions are listed in Table 1 along with the control composition containing no Printex XE2. Table 2 compares the colloidal properties of Printex XE2 with conventional carbon blacks N243, N330 and N110. The volume resistivity of the compositions was measured according to the procedure outlined in Table 3 using a spring loaded fixture designed for this purpose. The results of these measurements are reported in Table 4. Low volume resistivity is desirably to suppress static charge accumulation on the tire and vehicle. As apparent from Table 4, when no conventional carbon black was utilized, generally amounts of at least 8 parts of the extra conductive carbon black were required per 100 parts by weight of rubber to produce suitable resistivity values.

TABLE 1

Tire Tread Compositions Containing Extra Conductive Carbon Black

| | Control | A | B | C | D | E |
|---|---|---|---|---|---|---|
| SBR (Oil Extended) | 90.75 | 90.75 | 90.75 | 90.75 | 90.75 | 90.75 |
| Butadiene Rubber | 25.0 | 25.0 | 25.0 | 25.0 | 25.0 | 25.0 |
| Printex XE2 (Extra Conductive Carbon Black) | 0 | 8.0 | 16.0 | 24.0 | 32.0 | 40.0 |
| Silica[1] | 80 | 72.0 | 64.0 | 56.0 | 48.0 | 40.0 |
| Coupling Agent[2] (50% Carbon Black) | 16 | 14.4 | 12.8 | 11.2 | 9.6 | 8.0 |

TABLE 1-continued

Tire Tread Compositions Containing Extra Conductive Carbon Black

|  | Control | A | B | C | D | E |
|---|---|---|---|---|---|---|
| Processing Aids and Antioxidant | 34.67 | 34.67 | 34.67 | 34.67 | 34.67 | 34.67 |
| ZnO | 1.7 | 1.7 | 1.7 | 1.7 | 1.7 | 1.7 |
| Sulfur | 1.8 | 1.8 | 1.8 | 1.8 | 1.8 | 1.8 |
| Accelerators | 2.4 | 2.4 | 2.4 | 2.4 | 2.4 | 2.4 |

[1] Hi-Sil 190 manufactured by PPG.
[2] Bis(3-triethoxysilylpropyl)-tetrasulfide (Si69 ®) manufactured by Degussa AG.

TABLE 2

Carbon Black Colloidal Properties

|  | BET $m^2/gm$ | DBP $ml^3/100$ gm |
|---|---|---|
| Printex XE2 | 1000 | 400 |
| N110 | 143 | 113 |
| N330 | 83 | 102 |
| N343 | 97 | 130 |

TABLE 3

Volume Resistivity Measuring Procedure

| A) | 6" × 6" × 0.1" plaque samples were press cured at 340° F. for 15 min. |
|---|---|
| B) | A 6" × 2" test specimen was cut from each plaque. |
| C) | The 2" edges of each specimen were coated with Dag Dispersion 154 in ½" wide areas and allowed to dry at RT for 6 hours. The coating minimizes contact resistance during the measurements. |
| D) | Each specimen was placed in the test fixture and the resistance recorded using a standard resistance measuring meter. |
| E) | Volume Resistivity is calculated according to the following formula. |

$$P = \frac{R \cdot W \cdot T}{L} \times 2.54$$

P = Volume Resistivity in Ohm-cm
R = measured Resistance in Ohms
L = length in inches
W = width in inches
T = thickness in inches

TABLE 4

Volume Resistivity Determination of Composition Containing Extra Conductive Carbon Black

| Composition | Ohm-cm |
|---|---|
| Control | $4.9 \times 10^8$ |
| A | $4.5 \times 10^8$ |
| B | $2.29 \times 10^2$ |
| C | $2.69 \times 10^1$ |
| D | $1.38 \times 10^1$ |
| E | $5.89 \times 10^0$ |

Extra conductive carbon black (Printex XE2) was incorporated into an all-carbon black tread composition containing a conventional carbon black and no silica. The test compositions are listed in Table 5 along with the control composition without the extra conductive carbon black. Passenger tires (P215/70R15) were then built incorporating the control and the F and G tread compounds. The test compounds showed comparable behavior relative to the control compound in the plant mixing and tire building operations. Moreover, the test tires and control tire were evaluated for volume resistivity in a manner as set forth in Table 3, and for tire resistance. These are key measurements which relate to the ability of the tire to suppress static charge accumulation. The tire resistance test procedure is outlined in Table 7. The results are reported in Table 6 and show that the volume resistivity of tire tread F is three orders of magnitude lower and for tire tread G is 5 orders of magnitude lower than the control tire tread. Similarly, with regard to tire resistance values, the F composition tread is 3 orders of magnitude lower while the tire with the G composition tread is 4 orders lower than the control.

TABLE 5

All-Carbon Black Tire Tread Compositions Containing Extra Conductive Carbon Black (no silica)

|  | Control | F | G |
|---|---|---|---|
| SBR (Oil extended) | 80.5 | 80.5 | 80.5 |
| NR | 30.0 | 30.0 | 30.0 |
| Carbon Black (N343) | 41.0 | 29.2 | 32.4 |
| Printex XE2 (Extra Conductive Carbon Black) | 0 | 5.3 | 5.4 |
| Processing Aids and Antioxidant | 3.95 | 3.95 | 3.95 |
| ZnO | 3.0 | 3.0 | 3.0 |
| Sulfur | 1.3 | 1.3 | 1.3 |
| Accelerators | 1.9 | 1.9 | 1.9 |

TABLE 6

Volume Resistivity and Tire Resistance Measurements

|  | Control Compd. | F Compd. | G Compd. |
|---|---|---|---|
| Volume Resistivity, Ohm-cm | $9.1 \times 10^9$ | $5.3 \times 10^6$ | $1.9 \times 10^4$ |
| Tire Resistance, Ohm | $1.1 \times 10^{10}$ | $5.8 \times 10^7$ | $4.1 \times 10^6$ |

TABLE 7

Tire Resistance Measurement

Test Equipment

Wheel: special measurement wheel
Temperature: 70° F. +/− 3° F.
Relative Humidity: 30% max.
Inflation: 30 psi
Test Load: 85% of maximum sidewall load
Procedure

| 1. | Tire is mounted DOT side in on special wheel and inflated to the test inflation. |
|---|---|
| 2. | Test locations are then marked on the tire. |
| 3. | The tire is then loaded to the test load and resistance measurements are recorded at each location. |
| 4. | Resistance is recorded in Ohms. |

Additional silica containing tread formulations were made containing both conventional carbon black and extra conductive carbon black in accordance with recipes as set forth in Table 8. The rubber was compounded in a manner as set forth hereinabove and tested with regard to volume resistivity as set forth in Table 3. The results are set forth in Table 8.

TABLE 8

Extra-Conductive CB in 50%-Silica Tread Formulations & Slab Stock Physicals

|  | Control | H | I | J |
|---|---|---|---|---|
| Total CB PHR | 35 | 29.1 | 32.5 | 35.0 |
| SBR Rubber | 75.00 | 75.00 | 75.00 | 75.00 |
| Natural Rubber | 25.00 | 25.00 | 25.00 | 25.00 |
| Conventional Carbon Black | 32 | 19.30 | 24.50 | 27.00 |
| Printex XE2 | 0.00 | 6.80 | 5.00 | 5.00 |
| Hi-Sil 190 Silica | 30.00 | 30.00 | 30.00 | 30.00 |
| Silica Coupling Agent (50% carbon black) | 6.00 | 6.00 | 6.00 | 6.00 |
| Processing Aids and Antioxidants | 18.7 | 18.7 | 18.7 | 18.7 |
| Zinc Oxide | 3.0 | 3.0 | 3.0 | 3.0 |
| Sulfur | 1.7 | 1.7 | 1.7 | 1.7 |
| Accelerators | 2.0 | 2.0 | 2.0 | 2.0 |
| Volume Resistivity, Ohm-cm | $3.4 \times 10^9$ | $9.6 \times 10^6$ | $5.6 \times 10^7$ | $3.3 \times 10^7$ |

As apparent from Table 8, Examples H, I and J, which contained small amounts of extra conductive carbon black therein and sizeable amounts of conventional carbon black, still had good volume resistivity values of generally less than $10^8$ Ohm-cm, whereas the control with no extra conductive carbon black had poor volume resistivity.

While in accordance with the Patent Statutes, the best mode and preferred embodiment has been set forth, the scope of the invention is not limited thereto, but rather by the scope of the attached claims.

What is claimed is:

1. A tire component composition having suppressed static electricity accumulation, comprising:
    approximately 100 parts by weight of a least one tire component rubber, from 27 to about 90 parts by weight of silica per 100 parts by weight of said tire component rubber;
    from about 2 percent to about 20 percent by weight of a silica coupling agent based upon the total weight of said silica, and
    an effective amount of an extra conductive carbon black so that the wherein the amount of said extra conductive carbon black so that the tire component composition has a volume resistivity of $10^8$ Ohm-cm or less.

2. A conductive tire component composition according to claim 1, wherein said extra conductive carbon black has a BET surface area of at least 500 square meters per gram, wherein the amount of said extra conductive carbon black is from about 3 to about 50 parts by weight per 100 parts by weight of said tire component rubber, and
    wherein said amount of silica is from about 25 to about 65 parts by weight.

3. A conductive tire component composition according to claim 2, wherein said extra conductive carbon black has a BET surface area of at least 600 square meters per gram, and wherein said silica has a BET surface area of from about 40 to about 600 square meters per gram, and including from about 15 to about 80 parts by weight of a conventional carbon black per 100 parts by weight of said tire component rubber.

4. A conductive tire component composition according to claim 3, wherein the amount of said extra conductive carbon black is from about 9 to about 35 parts by weight, wherein the amount of said silica is from about 30 to about 45 parts by weight and, wherein the amount of said silica coupling agent is from about 7 percent to about 16 percent by weight, and wherein said conductive tire component composition has a volume resistivity of less than $10^4$ Ohm-cm.

5. A conductive tire component composition according to claim 3, wherein said conductive component is a tire tread.

6. A conductive tire component composition according to claim 1, including from about 15 to about 80 parts by weight of a conventional carbon black per 100 parts by weight of said tire component rubber.

7. A process for improving the conductivity of a silica containing cured tire tread composition, comprising:
    adding an effective amount of an extra conductive carbon black having a BET surface area of at least 500 square meters per gram to a silica tire tread composition having at least one rubber therein to suppress static electricity accumulation,
    adding an effective amount of a silica coupling agent to chemically bind the silica to the rubber
    forming a tire tread, and
    curing said tire tread.

8. A process according to claim 7, wherein the amount of said silica is from 27 to about 90 parts by weight per 100 parts by weight of said tire tread rubber.

9. A process according to claim 8, wherein said tire tread composition has a volume resistivity of less than $10^8$ Ohm-cm, wherein said extra conductive carbon black has a BET surface area of at least 600 square meters per gram, and wherein the effective amount of said silica coupling agent is from about 2 percent to about 20 percent by weight based upon the total weight of said silica.

10. A process according to claim 9, wherein said extra conductive carbon black has a BET surface area of at least 750, wherein the amount of said extra conductive carbon black is from about 3 to about 50 parts by weight per 100 parts by weight of said tire tread rubber, wherein the amount of said silica is from about 25 to about 65 parts by weight per 100 parts by weight of said tire tread rubber, and wherein said silica has a BET surface area of from about 50 to about 300.

11. A process according to claim 10, wherein said tire tread composition has a volume resistivity of less than $10^6$ Ohm-cm.

12. A process according to claim 9, including adding conventional carbon black to said silica tire tread composition in an amount of from about 15 to about 40 parts by weight per 100 parts by weight of said rubber.

13. A process according to claim 13, including adding conventional carbon black to said silica tire tread composition in an amount of from about 15 to about 40 parts by weight per 100 parts by weight of said rubber, and wherein the amount of said extra conductive carbon black is from about 5 parts to about 15 parts by weight.

14. The tire component composition of claim 2,
    wherein the tire component is a tire tread, wherein the rubber is natural rubber, synthetic polyisoprene, styrene-butadiene rubber, or combinations thereof, and
    wherein the silica has a BET surface area of from about 50 to about 300.

15. The tire component composition of claim 4,
    wherein the tire component is a tire tread, wherein the rubber is natural rubber, synthetic polyisoprene, styrene-butadiene rubber, or combinations thereof, and
    wherein the silica has a BET surface area of from about 50 to about 300.

16. The tire component composition of claim 6, wherein the tire component is a tire tread, wherein the rubber is natural rubber, synthetic polyisoprene, styrene-butadiene rubber, or combinations thereof, and wherein the silica has a BET surface area of from about 50 to about 300.

* * * * *